(No Model.)
F. L. BOUQUET & P. FLOOD.
STREET CAR BRAKE HANDLE.
No. 537,800. Patented Apr. 16, 1895.
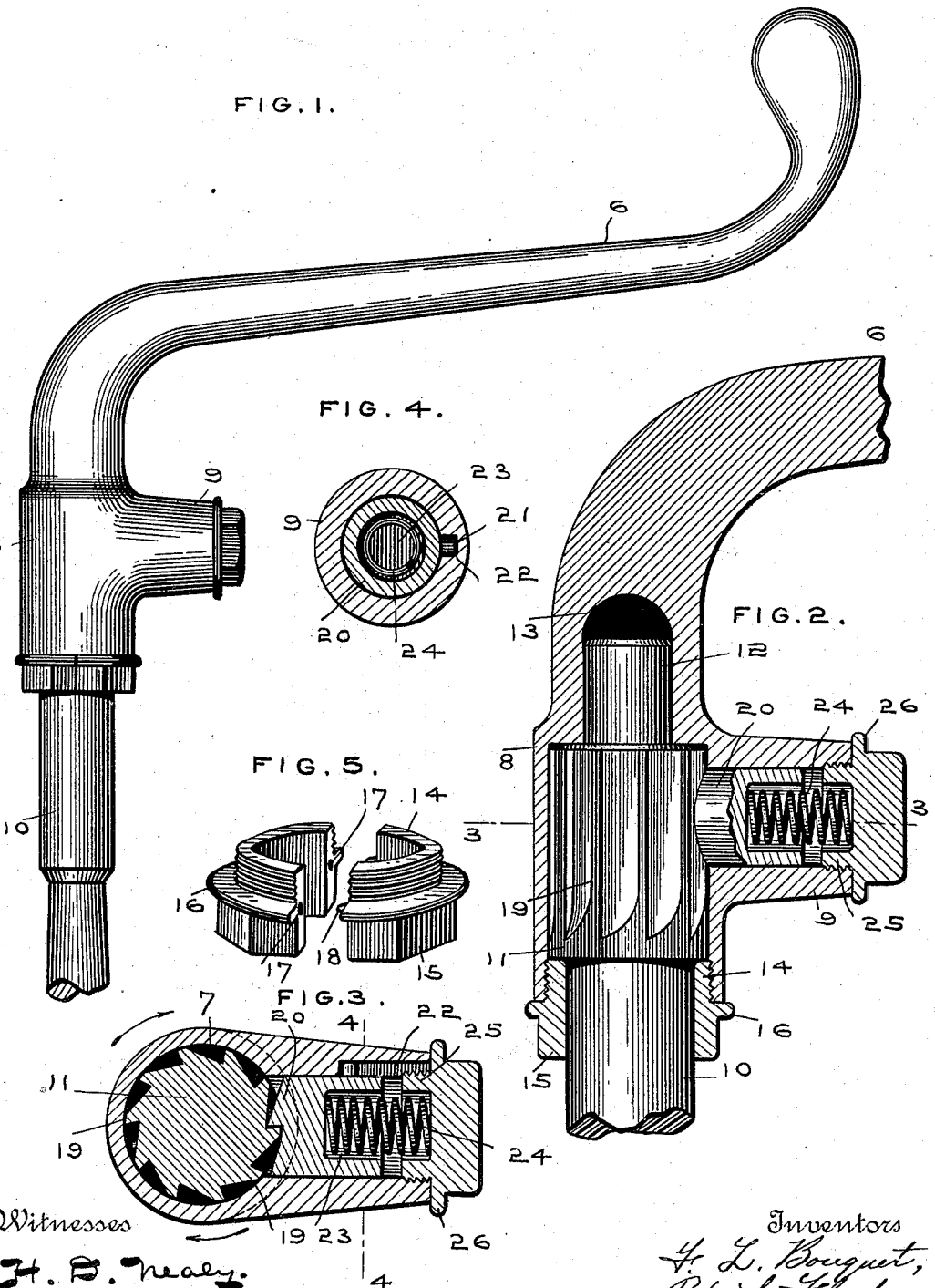

UNITED STATES PATENT OFFICE.

FRANCIS L. BOUQUET AND PATRICK FLOOD, OF ST. LOUIS, MISSOURI.

STREET-CAR BRAKE-HANDLE.

SPECIFICATION forming part of Letters Patent No. 537,800, dated April 16, 1895.

Application filed January 28, 1895. Serial No. 536,412. (No model.)

*To all whom it may concern:*

Be it known that we, FRANCIS L. BOUQUET and PATRICK FLOOD, citizens of the United States, residing at the city of St. Louis, State of Missouri, have invented certain new and useful Improvements in Street-Car Brake-Handles, of which the following is such a full, clear, and exact description as to enable any one skilled in the art to which it appertains to make and use the same, reference being had to the accompanying drawings, forming part of this specification.

Our invention relates to new and useful improvements in street car brake handles, and to one of that class wherein a pawl and ratchet are used to enable the operator to set the brake without a continuous turning of the handle allowing him to obtain the best leverage on the handle as the brake tightens, and it will be understood from the following description.

Referring to the drawings, Figure 1 is an elevation of one of our improved handles in place on the brake spindle or rod of a car, the lower part of the spindle being broken away. Fig. 2 is a vertical sectional view of the same. Fig. 3 is a horizontal cross sectional view on the line 3—3, of Fig 2. Fig. 4 is a vertical cross sectional view on the line 4—4, of Fig. 3. Fig. 5 is a detail perspective view of the two halves of the divided ring nut which holds the handle in place on the brake spindle.

In detail, 6 represents a car brake handle, 7 being a socket in its enlarged lower end 8, and 9 is a housing formed on one side of the enlargement 8, the inside of the housing opening into the socket 7, and preferably at right angles thereto.

10 is the brake spindle or rod which is provided with the collar or enlargement 11, near its upper end, this enlargement fitting loosely within the socket 7 of the brake handle, and the end 12 of the brake spindle having a bearing in the smaller or contracted upper end 13 of the socket, as shown in Fig. 2.

The collar or enlargement 11 of the brake spindle when in place does not extend to the lower end of the socket 7, and the brake handle is held in place on such spindle by a divided ring-nut 14 which is exteriorly threaded on its inner end, and screws into the lower screw-threaded end of the socket 7, and around the spindle 10 below its collar or enlargement 11, the spindle working loosely through the divided ring-nut 14, which has a bearing all around the spindle, so that there is no wear on either the nut or spindle as is the case where a set screw is used to hold the handle in place, and which usually works in a groove around the spindle. The ring-nut has preferably an angular head 15 for turning it in place, and an annular flange 16 which bears against the lower end 8 of the brake handle when fully in place.

17 are recesses or holes in one half of the divided ring-nut 14, which register with projections 18 on the other half of the same, shown in Fig. 5, so that when the two parts of such ring-nut are brought together they form, to all purposes, a solid ring-nut.

The outside of the collar or enlargement 11 of the brake spindle is fluted as shown in Figs. 2 and 3, so as to form elongated ratchet teeth 19 around the spindle. 20 is a pawl or dog which works loosely in the housing 9, and which is adapted to engage with the ratchet teeth of the brake spindle, the pawl or dog 20 having a projection 21 on its side which works in a groove 22 in the inside of the housing 9, preventing the pawl from turning in the housing and thus serving to keep the straight or toothed part of the pawl always in a similar position to the ratchet teeth 19.

The pawl 20 is cored out at the rear, as at 23, to form a seat for one end of a coiled spring 24, the other end of such spring being seated in the cored out inner end of a nut or screw cap 25, which screws into the end of the housing 9 and closes it, the nut 25 having an annular flange 26, which prevents it going in too far. The pawl will thus be constantly held against the ratchet teeth 19, and by turning the brake handle in the direction indicated by the arrows in Fig. 3, the brake spindle or rod will be also turned, the handle being turned as far as desired, at each operation, thus operating to put on the brake in the usual way.

When the brake is nearly on and the greatest power is required on the brake handle, by turning the handle backward and forward at that point where the greatest leverage is obtained the brake is quickly and easily set, the handle while being turned forward turning the brake spindle with it, and when turned backward the pawl or dog 20 slipping over the ratchet teeth 19, while the brake spindle is held from turning by the usual foot dog at its lower end, and on the car floor. The brake may be entirely set without completely turning the handle as just mentioned, and when set in that way or by turning it continuously, when the foot dog below it is released, the brake spindle and handle will come back to their normal positions.

Through the projection 21 on the side of the pawl 20 and which works in the groove 22, the pawl is prevented from turning in the housing 9 and is therefore always in the same line with relation to the teeth 19 of the ratchet, thus insuring full engagement with the same. When putting the brake handle together the groove 22 in the housing 9 causes the dog 20 to always be put in the housing in a proper position for it to engage with the ratchet teeth, as the dog cannot be put in the housing at all unless its projection 21 registers with the groove 22.

By unscrewing the divided ring-nut 14, the brake handle can be removed at will, and the ring-nut may also be removed from the brake spindle or rod without detaching such spindle from its connections with the car. The great advantage of a divided nut over a solid one is that when making the brake rod the solid nut must be put on before the two parts of the rod are welded together, and the blacksmith in his work will find it in his way and will be liable to injure the nut so as to render it imperfect, or to totally ruin it. This cannot happen with the divided nut, as it is not put on the brake rod until the handle is to be put in place.

Our brake handle is simple and compact in construction, easy to operate, there being little friction and is one that is not liable to get out of order or to be broken, and if it should, it can be easily repaired.

Having fully described our invention, what we claim as new, and desire to secure by Letters Patent of the United States, is—

In combination with a brake spindle having ratchet teeth around its end, a brake handle working loosely over the end of such spindle and ratchet teeth and carrying a spring pawl which engages with such teeth, such handle retained in place by a divided ring-nut screwing into it from below.

In testimony whereof we have hereunto set our hands and affixed our seals this 23d day of January, 1895, in the presence of two subscribing witnesses.

FRANCIS L. BOUQUET. [L. S.]
PATRICK FLOOD. [L. S.]

Witnesses:
JOHN F. GREEN,
A. C. FOWLER.